(No Model.)
H. C. DYER.
COTTON CHOPPER.
No. 268,204. Patented Nov. 28, 1882.
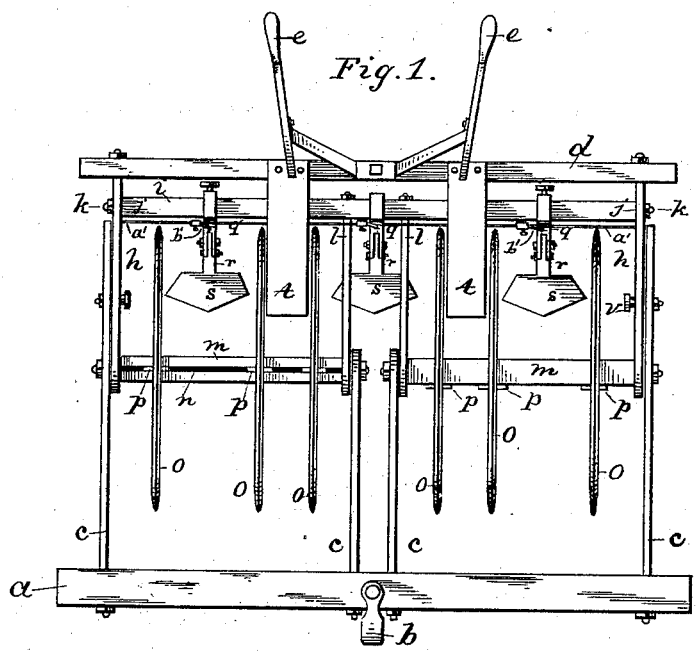
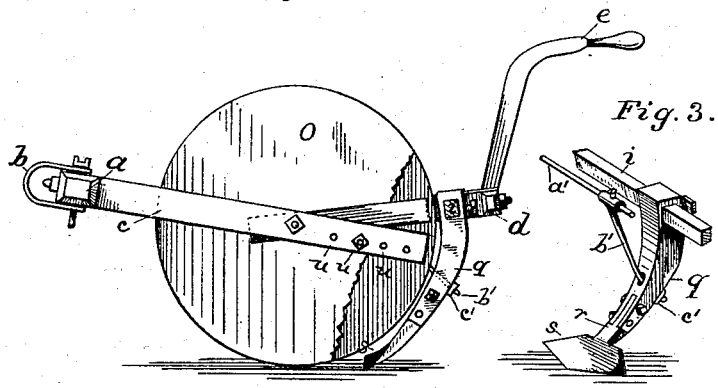
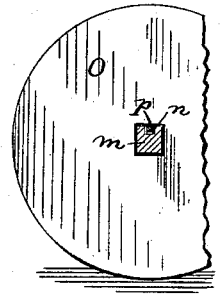
WITNESSES:
INVENTOR:
ATTORNEYS.

UNITED STATES PATENT OFFICE.

HENRY C. DYER, OF CHARLESTON, ARKANSAS.

COTTON-CHOPPER.

SPECIFICATION forming part of Letters Patent No. 268,204, dated November 28, 1882.

Application filed June 9, 1882. (No model.)

*To all whom it may concern:*

Be it known that I, HENRY C. DYER, of Charleston, Franklin county, in the State of Arkansas, have invented a new and useful Improvement in Cotton-Choppers; and I do hereby declare that the following is a full, clear, and exact description of the same, reference being had to the accompanying drawings, forming a part of this specification, in which—

Figure 1 is a top view of my improved cotton-chopper. Fig. 2 is an end elevation, partly broken away. Figs. 3 and 4 are detail views.

The main object of my invention is to remove or hoe out by a machine a portion of the young cotton-plants in the rows of a cotton-field, so as to form a "stand," leaving only at regular intervals those plants which are to remain; and to this end my invention consists, first, of a machine designed to operate across the rows or cotton-ridges, and at right angles thereto, by horse or other power, and provided with a series of revolving circular cutters or disks, adjustable, and turning with two or more horizontal shafts journaled in the frame of the machine and in line with each other, adjustable hoes being secured to the frame in the spaces between the adjacent revolving cutters, between which the cotton-plants are to be removed, the other spaces between the adjacent revolving cutters, not provided with hoes, in which are the plants to remain and form the stand, being protected from injury by the revolving disks or cutters.

My invention further consists in certain details of construction, hereinafter more fully set forth.

In the accompanying drawings, *a* represents the front beam of the frame, extending the entire length of the machine, and provided with the draft attachment *b* at its middle, and near its ends and middle with the removable arms *c c* at right angles to the beam *a* and secured thereto.

*d* represents the horizontal rear beam of the machine, extending its entire length and parallel with the front beam, *a*, and provided near its middle with the handles *e e* to operate the machine, and near its ends with the removable arms *h h* at right angle to the rear beam, *d*.

*i* represents the horizontal hoe-shaft, extending the entire length of the machine, and parallel with and arranged near the rear beam, *d*. The outer ends of the horizontal hoe-shaft *i* are reduced in size, and rounded and threaded, and pass through opposite threaded holes *j* in the arms *h*, and are provided with nuts *k*, whereby the hoe-shaft *i* can be adjusted longitudinally.

*l l* represent arms removably secured to the hoe-shaft near its middle.

*m m* represent two horizontal shafts, the ends of which are journaled in bearings formed in the arms *c c*, *h h*, and *l l*. The two horizontal shafts *m m* are thus arranged in the same right line, but are entirely independent of each other.

*n* represents a groove made longitudinally in each shaft *m*.

*o* represents a series of revolving circular cutters or disks, adjustably secured on the shafts *m m* by means of the keys *p*, inserted in the groove *n* at the central orifices of the revolving cutters; or the latter may each be provided with a central cylindrical flange at its center, provided with a hole and set-screw; or any other suitable means may be provided by which the revolving circular cutters may be longitudinally adjusted on the shafts *m*.

*q q* represent shanks, each provided with a central opening near its upper end, through which openings the hoe-shaft *i* passes. Each of the shanks *q*, excepting the central one, is provided with a hole and set-screw, whereby each shank *q* may be adjusted longitudinally along the hoe-shaft. The lower end of each shank *q* is bifurcated and adapted to receive the upper end of the shank *r* of the hoes. The upper end of the hoe-shank *r* is removably secured to the shank *q* by means of a bolt and nut.

*a'* represents a bar secured to the frame of the machine, and parallel to the hoe-shaft *i* and arranged in front of it.

*b' b'* represent rods, each provided with an opening near its upper end, through which openings the bar *a'* passes. The openings in each of the rods *b'*, excepting the central one, are provided with holes and set-screws, whereby each rod may be adjusted longitudinally on the bar *a'*. The lower end of each rod *b'* passes through a hole in one of the shanks *q*, and is screw-threaded at its lower end and provided with a nut, *c*, whereby the hoes are supported and their depth regulated. One or more hoes may be arranged between two adjacent revolving cutters, as desired, the hoes lying opposite the spaces in the rows from which the young plants are to be removed, and the spaces between the revolving cutters opposite which there are no hoes lie opposite the plants which are to be left standing, the revolving cutter in the operation of the machine protecting the young plants which are to form the stand.

$t\ t$ represent cleaners for the revolving circular cutters $o$, secured to the rear beam, $d$, and extending between the adjacent revolving cutters opposite which there are no hoes.

It will be seen that by my construction the hoe-shanks can readily be removed and plows substituted for the hoes; or a double scraper for each side of a ridge may be substituted for the hoes to scrape the cotton-ridges and work the cotton, the machine in this case being operated lengthwise of the ridges.

The outer arms, $c\ c$, secured to the ends of the front beam, $a$, are extended rearwardly of the shafts $m$, and provided with a series of adjusting-holes, $u$, for the reception of the bolts $v$, the function of which is to form a rest to hold the hoes up in crossing from one row of cotton-plants to the other, as it is not necessary for the hoes to touch the ground, except on the ridges, where it removes the superfluous young plants and dirt.

The shaft of the revolving cutters or disks is made in two parts, in order that the machine may be more readily turned around, as in turning the machine one section, with its revolving disks or cutters, moves forward and the other section backward at the same time, thus facilitating the turning of the machine.

In practice the machine is drawn by horse-power across the cotton-rows, and at right angles thereto. The revolving cutters are adjusted on their shafts at a distance from each other equal to the space between the stalks of cotton to be left in the ridges to form a stand, and the hoes are adjusted on their shaft. The revolving circular cutters bear the entire weight of the frame, and mark the ground on a cotton-ridge, separating the plants to be removed from those to be left. The hoes follow the revolving cutters, remove the dirt on the top of the ridge and the young plants with it, and the adjacent cutters, forming spaces opposite which there are no hoes, protect the young plants left to form a stand.

What I claim as my invention, and desire to secure by Letters Patent, is—

1. The combination, with the front beam, $a$, provided with the arms $c$, rear beam, $d$, having the arms $h\ h$, and hoe-shaft $i$, provided with the arms $l\ l$, of the independent horizontal shafts $m\ m$, journaled in the arms and arranged in line with each other, and revolving cutters or disks supporting the frame, whereby the turning of the machine is facilitated, substantially as described.

2. The combination, with the separate and independent shafts $m\ m$, journaled in the frame in line with each other, and each provided with a longitudinal groove, $n$, of the revolving adjustable circular disk $o$, supporting the machine, and adapted to separate the plants to be removed from those left, and protect the latter, hoe-shaft $i$, and longitudinally-adjustable hoes $s$, substantially as described, and for the purpose set forth.

3. The combination, with the front beam, $a$, provided with the arms $c$, extending rearwardly of shafts $m$, and provided with holes $u$, of the rear beam, $d$, having the arms $h\ h$ and bolts $v$, whereby a rest is formed to hold the hoes up in crossing the space between two ridges, substantially as described.

4. The combination of the front beam, $a$, provided with the arms $c$, rear beam, $d$, having the arms $h\ h$, adjustable hoe-shaft $i$, provided with the arms $l\ l$, independent shafts $m$, adjustable circular cutters $o$, adjustable hoes $s$, and cleaners $t$, substantially as described, and for the purpose set forth.

HENRY CLAY DYER.

Witnesses:
RIDGE WHITLOCK,
JAMES H. NEAL.